US011570182B1

(12) United States Patent
Tran et al.

(10) Patent No.: US 11,570,182 B1
(45) Date of Patent: Jan. 31, 2023

(54) COMPUTE-LESS AUTHORIZATION

(71) Applicant: Amazon Technologies, Inc., Seattle, WA (US)

(72) Inventors: Richard Nhan Tran, San Diego, CA (US); Srdan Mihajlovic, San Diego, CA (US); Kevin J. Park, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 16/834,488

(22) Filed: Mar. 30, 2020

(51) Int. Cl.
*H04L 9/40* (2022.01)
*G06F 16/22* (2019.01)
*G06F 16/24* (2019.01)

(52) U.S. Cl.
CPC ........ *H04L 63/105* (2013.01); *G06F 16/2282* (2019.01); *G06F 16/24* (2019.01); *H04L 63/08* (2013.01)

(58) Field of Classification Search
CPC ... H04L 63/105; H04L 63/08; G06F 16/2282; G06F 16/24
See application file for complete search history.

(56) References Cited

U.S. PATENT DOCUMENTS

| | | | | |
|---|---|---|---|---|
| 7,360,090 B1* | 4/2008 | Doskow | ............... | H04Q 3/0025 713/170 |
| 7,558,796 B1* | 7/2009 | Bromwich | ............... | G06F 16/24 |
| 8,244,714 B1* | 8/2012 | Collins | ............... | G06F 16/2457 707/766 |
| 8,397,280 B1* | 3/2013 | Zhu | ........................ | H04L 61/203 726/4 |
| 8,429,097 B1* | 4/2013 | Sivasubramanian | ........................ | G06F 16/2282 706/12 |
| 9,219,736 B1* | 12/2015 | Lewis | ..................... | H04L 67/22 |
| 9,727,623 B1* | 8/2017 | Catania | ............... | G06F 16/2379 |
| 10,289,620 B1* | 5/2019 | Cleaver | .................. | G06F 16/23 |
| 10,303,688 B1* | 5/2019 | Sirin | .................. | G06F 16/2458 |
| 10,558,541 B1* | 2/2020 | Chakkassery Vidyadharan | .......... | G06F 11/3006 |
| 10,706,056 B1* | 7/2020 | Lin | ..................... | H04L 63/1425 |
| 10,719,503 B1* | 7/2020 | Bar Oz | ................. | G06F 16/219 |
| 2003/0069874 A1* | 4/2003 | Hertzog | ............... | G06Q 10/109 |
| 2007/0156848 A1* | 7/2007 | Becker | .................... | G06F 16/24 709/219 |

(Continued)

*Primary Examiner* — Aravind K Moorthy
(74) *Attorney, Agent, or Firm* — Klarquist Sparkman, LLP

(57) ABSTRACT

An endpoint determines whether a client is authorized to access data. A database stores separate authorizations of a permission model in a data table along with the data. Mapping templates of the endpoint convert a client request for data into a database query for client authorization and the requested data. In response to the query, the database returns to the endpoint the requested data as well as an indication of authorization from the data table. The mapping templates of the endpoint are then used to generate an appropriate response to the client. When the database response indicates the client is authorized, the endpoint can return the requested data to the client. When the database response indicates the client is not authorized, the endpoint can return an error. In some embodiments, the endpoint is an application programming interface (API) gateway that conforms to representational state transfer (REST) software architecture.

19 Claims, 6 Drawing Sheets

(56) References Cited

U.S. PATENT DOCUMENTS

| | | | |
|---|---|---|---|
| 2007/0192351 A1* | 8/2007 | Liu | G06F 16/86 707/999.102 |
| 2008/0098028 A1* | 4/2008 | Shan | G06F 16/972 707/999.102 |
| 2009/0287704 A1* | 11/2009 | Yang | G06F 21/6227 707/999.009 |
| 2009/0307451 A1* | 12/2009 | Abzarian | G06F 12/1483 711/170 |
| 2010/0005091 A1* | 1/2010 | Bayliss | G06F 16/24578 707/E17.014 |
| 2010/0299338 A1* | 11/2010 | Aarni | H04W 8/22 707/769 |
| 2011/0161656 A1* | 6/2011 | Rao | G06F 21/335 713/168 |
| 2012/0290620 A1* | 11/2012 | Guan | G06F 16/252 707/E17.014 |
| 2012/0311151 A1* | 12/2012 | Paulsen | H04L 63/102 709/225 |
| 2014/0165149 A1* | 6/2014 | Chen | H04L 63/10 726/4 |
| 2015/0058931 A1* | 2/2015 | Miu | G06Q 20/02 707/784 |
| 2015/0058950 A1* | 2/2015 | Miu | G06F 21/44 726/7 |
| 2015/0199346 A1* | 7/2015 | Wieczorek | G06F 16/9038 707/736 |
| 2016/0127374 A1* | 5/2016 | O'Connell | G06F 16/9535 726/4 |
| 2016/0173466 A1* | 6/2016 | Stevens | H04W 4/60 726/7 |
| 2016/0239540 A1* | 8/2016 | Zheng | G06F 16/248 |
| 2016/0342685 A1* | 11/2016 | Basu | G06F 16/367 |
| 2016/0364445 A1* | 12/2016 | Golec | G06Q 10/10 |
| 2017/0141992 A1* | 5/2017 | Borisov | G06F 11/3096 |
| 2017/0185576 A1* | 6/2017 | Agarwal | G06N 20/00 |
| 2017/0262483 A1* | 9/2017 | Abreu | G06F 16/2379 |
| 2017/0286464 A1* | 10/2017 | Punti | G06F 16/951 |
| 2018/0084604 A1* | 3/2018 | Ou | H04W 76/36 |
| 2018/0293115 A1* | 10/2018 | Skeem | G06F 16/252 |
| 2018/0293508 A1* | 10/2018 | Ko | G06F 16/355 |
| 2018/0337926 A1* | 11/2018 | O'Connell | G06F 16/9535 |
| 2018/0349963 A1* | 12/2018 | Laufenberg | G06F 16/9535 |
| 2019/0147082 A1* | 5/2019 | Cleaver | G06F 16/248 707/779 |
| 2019/0163460 A1* | 5/2019 | Kludy | H04L 63/061 |
| 2019/0245875 A1* | 8/2019 | Chen | H04L 29/06 |
| 2019/0295684 A1* | 9/2019 | Allyn-Feuer | G16B 40/00 |
| 2019/0303409 A1* | 10/2019 | Nishino | G06F 12/00 |
| 2019/0306171 A1* | 10/2019 | Sisley | G06F 21/6218 |
| 2019/0340940 A1* | 11/2019 | Elkabetz | G01W 1/02 |
| 2019/0384863 A1* | 12/2019 | Sirin | G06K 9/6262 |
| 2020/0073983 A1* | 3/2020 | Sen | G06F 16/243 |
| 2020/0134057 A1* | 4/2020 | Kruempelmann | G06F 16/25 |
| 2020/0172987 A1* | 6/2020 | Quinones-Mateu | G16C 20/64 |
| 2020/0280366 A1* | 9/2020 | Bode | H04L 67/10 |
| 2020/0293428 A1* | 9/2020 | Zhang | G06F 11/3664 |
| 2021/0042308 A1* | 2/2021 | Mustafi | G06F 7/00 |
| 2021/0091951 A1* | 3/2021 | Wilson | H04L 67/146 |
| 2021/0112059 A1* | 4/2021 | Heldman | H04L 67/10 |
| 2021/0132935 A1* | 5/2021 | Dinh | G06F 9/4411 |
| 2021/0135971 A1* | 5/2021 | Martin | H04L 43/50 |
| 2021/0141924 A1* | 5/2021 | Gorman | G06Q 30/018 |
| 2021/0168127 A1* | 6/2021 | Jensen | H04L 67/16 |
| 2021/0240544 A1* | 8/2021 | Ramachandran | G06F 8/316 |
| 2021/0358489 A1* | 11/2021 | Hussain | G10L 15/1822 |
| 2021/0406383 A1* | 12/2021 | Ahuja | G06F 21/577 |

* cited by examiner

| ID 414 | RANGE 416 | DATA 418 | CATEGORY 420 |
|---|---|---|---|
| 1234567 | music#0 | {"key1":"value1"} | music |
| 7654321 | clothing#0 | {"key2":"value2"} | clothing |
| arn:aws:iam::6488358:role/real | music#read#0 | | music |
| arn:aws:iam::6488358:role/real | music#read#1 | | music |
| arn:aws:iam::6488359:role/real | clothing#read#0 | | clothing |
| arn:aws:iam::6488361:role/real | music#read#0 | | music |

COMPUTE-LESS AUTHORIZATION

BACKGROUND

Access to cloud-based resources can require authentication and authorization. Authentication is the process of verifying the identity of the user. It can be based on user credentials, for example, through use of a unique identification in combination with a secret key password, or token, or cryptographically verifiable signature. In contrast, authorization is the process of verifying that the user has permission to access a specific resource or perform a specific function. For example, in response to a request from an authenticated user, a system can check with a permission model to determine if the user is authorized to access data within the database. Typically, the system employs a compute service (e.g., a server computer or serverless computing platform) to perform the authorization check. However, the use of a compute service for the authorization check may introduce undesirable latency for accessing data within the database.

DETAILED DESCRIPTION

An endpoint, which receives a request from a client, is used to perform an authorization check instead of using a compute service to perform the authorization check. A database stores separate entries for each authorized client identifier. The endpoint is designed to process the client request into an appropriate query of the database for authorization information in addition to any data requested by the client. In particular, the endpoint has mapping templates that convert the client request into the appropriate database query. In response to the query, the database returns the requested data to the endpoint, as well as an indication of authorization from the data table. The mapping templates are also used by the endpoint to generate an appropriate response to the client. When the database response indicates the client is authorized, the endpoint can return the requested data to the client. When the database response indicates the client is not authorized (e.g., no entry for the client identifier for the particular category or requested data attributes), the endpoint can send an error indication without otherwise returning the requested data.

As used herein, endpoint refers to a service-oriented architecture interface that is exposed to receive a request from a client and that returns a response to the client based on the request. In some embodiments, the endpoint extracts information from the client request, packages the extracted information, and makes a further request to another service (e.g., database) based on the packed information in order to fulfill the client request. As such, the endpoint has limited functionality as compared to a compute service (e.g., server computer or serverless computing platform) and thus would not typically be considered for performing such an authorization check. However, customizations of the mapping templates of the endpoint and of data within an affiliated database enables the endpoint to perform the authorization check despite the limited functionality and without a separate compute service. Latency introduced by the compute service in retrieving data from a database is thus avoided, or at least reduced. Since the compute service is not required to perform authorization, the cost and setup associated with the compute service is also avoided. For example, the endpoint can constitute an application programming interface (API) or an API gateway service that generates one or more APIs, with each API conforming to the representational state transfer (REST) standard. In a particular exemplary embodiment, the endpoint is provided by Amazon API Gateway service.

Figure 1:
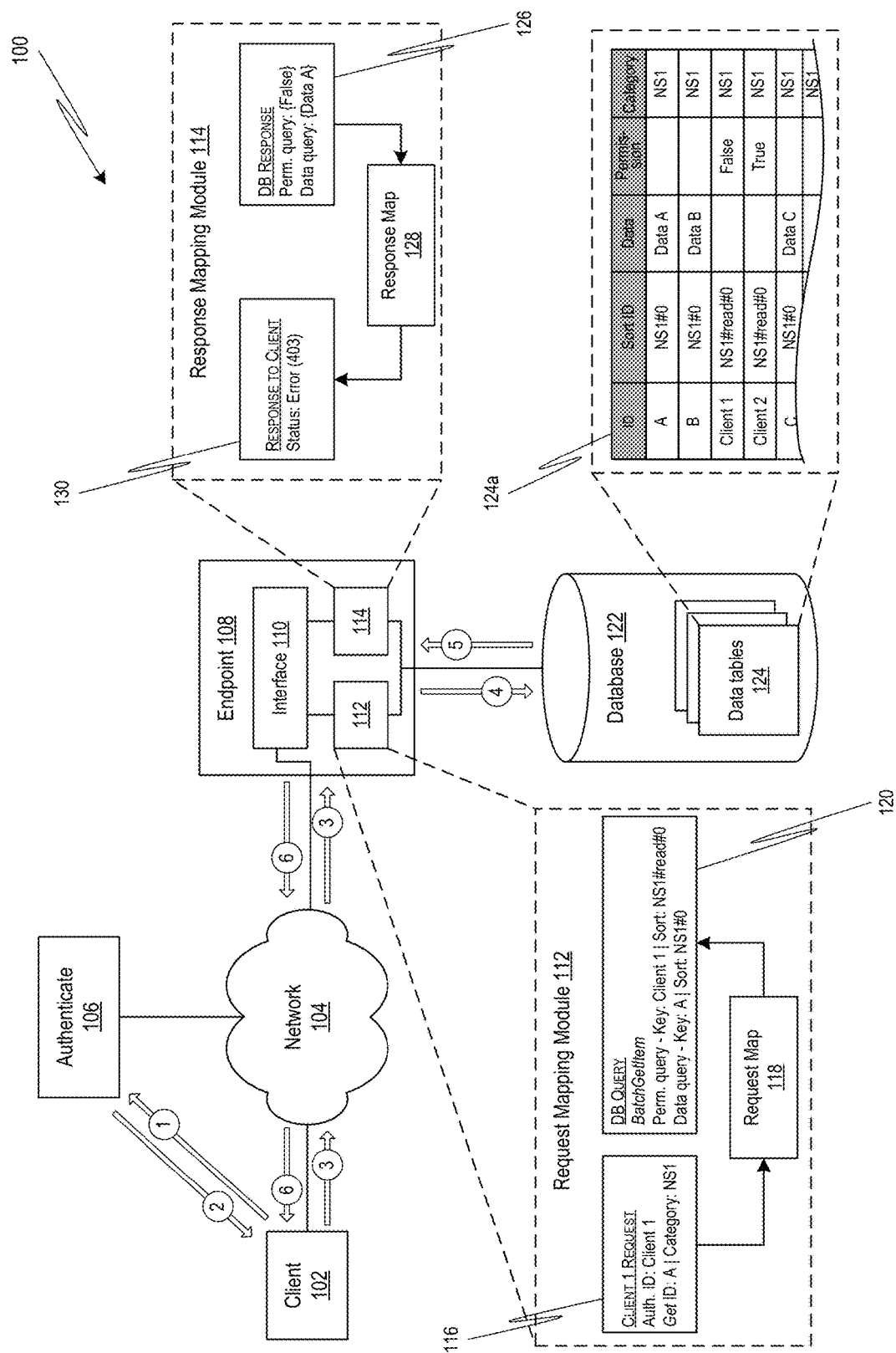
FIG. 1 is a simplified schematic diagram of compute-less authorization by an endpoint, according to one or more embodiments of the disclosed subject matter.

FIG. 1 shows an exemplary setup 100 for compute-less authorization by an endpoint 108, in particular, to allow a client 102 to access data in a database 122. Client 102 is connected to endpoint 108 (e.g., API gateway) and to an authentication module 106 via network 104. The endpoint 108 is operatively coupled to database 122 via a separate networking link. For example, the endpoint 108 and database 122 is part of a private network that is exposed externally via the connection of endpoint 108 to network 104. Alternatively, database 122 may also be connected to network 104, and the endpoint 108 can access the database 122 via network 104.

Network 104 includes any combination of networking hardware and software used to establish communications between client 102 and endpoint 108. For example, the network 104 can be an Internet area network (IAN), a wide area network (WAN), a local area network (LAN) connected to a WAN, or any other network configuration. In some embodiments, client 102 may be part of an internal enterprise network separate from that of the endpoint 108 and/or database 122. In such embodiments, network 104 can include hardware (e.g., modems, routers, switches, etc.) and software (e.g., firewall software, security software, billing software, etc.) to establish a networking link between the client 102 and the Internet and between the Internet and the endpoint 108 and/or database 122. It should be appreciated that the network topology illustrated in FIG. 1 has been simplified and that many more networks and networking devices can be utilized to interconnect the various computing systems disclosed herein.

Although only one client 102 is illustrated in FIG. 1 for explanation purposes, additional clients would be provided in practical embodiments. Each client 102 can be any type of client that can be configured to submit a request to endpoint 108 via network 104, in particular, requests for database services. For example, client 102 can be a web browser, or a plug-in module or a code module configured to execute as an extension to or within the web browser. In another example, client 102 (e.g., a database service client) is an application, such as, but not limited to, a database application, a media application, an office application, or any other application that uses persistent storage resources to store or access a database table(s) 124. In some embodiments, client 102 provides access to data tables 124 of database 122 to other applications in a manner that is otherwise transparent to those applications. In one example, client 102 integrates with an operating system or file system to provide storage, but the operating system or file system presents a different storage interface to applications. These applications can remain unmodified since interfacing with endpoint 108 to access data tables 124 is handled by client 102 on behalf of applications executed within the operating system.

Requests from client 102 are initiated using a web service request, for example, an API request to the endpoint 108. For purposes of simplicity, web service requests will be generally described below as API requests, but it is understood that other web service requests can be made. An API request is a programmatic interface to endpoint 108 expressed in JavaScript Object Notation (JSON) or extensible markup language (XML). For example, the endpoint 108 is a defined request-response message system that is exposed by a hypertext transfer protocol (HTTP) based web server. Thus, in certain implementations when endpoint 108 is an API, the API can be defined as a set of HTTP request messages along with a definition of the structure of response messages, which can be in XML or JSON format. The API can specify a set of functions or routines that perform an action, which includes accomplishing a specific task or allowing interaction with a software or hardware component.

When the endpoint 108 receives the API request from client 102, the endpoint 108 generates a subsequent request and sends the request to the endpoint identified in the client request (e.g., database 122). In some embodiments, the client 102 is configured to generate a service request to endpoint 108 according to the REST standard, according to a document-based or message-based network services architecture (e.g., Simple Object Access Protocol (SOAP)), or any other network services protocol. For example, both the client 102 and the endpoint 108 can be configured to generate and process requests in conformance with the REST architectural style.

The endpoint 108 includes an interface component 110 and one or more mapping modules 112, 114. The interface component 110 is configured to coordinate communication with network 104 and with database 122. Each mapping module includes software logic configured to map a transmission received by the interface component 110 into a separate format for transmission from the interface component 110. In particular, the request mapping module 112 includes a mapping template 118 that converts a request 116 from client 102 into an appropriate database request 120. Similarly, the response mapping module 114 includes a mapping template 128 that converts a database response 126 into a response message 130 to the client. Although illustrated as separate components in FIG. 1, mapping modules 112, 114 may instead be part of a single component, and mapping templates 118, 128 may be part of a single mapping template. In a particular exemplary embodiment, the mapping templates are defined using a Java-based template engine, such as Apache Velocity.

Database 122 (i.e., database service) includes one or more data tables 124 with data stored therein. Database 122 can be a structured query language (SQL) database, a non-relational distributed database (e.g., NoSQL), or any other type of network-based data storage service. In a particular exemplary embodiment, database 122 is a NoSQL database service that supports key-value and document data structures, such as Amazon DynamoDB. However, in order to allow endpoint 108 to perform an authorization check of a client request for data in database 122, the data storage within the database 122 is customized. In particular, the data table 124*a*, which includes data that may be requested by client 102, is modified to also include the permission model for authorization. The permission model reflects schemes that represent access levels mapped to authentication identities of the clients. The data table 124*a* is thus modified to include separate entries for each authenticated identity (corresponding to client 102) and for each entity level (e.g., category). While this may result in duplicate entries for each authenticated identity in the table 124*a* (e.g., to reflect different entity levels), it allows the endpoint 108 to interrogate the database 122 to determine authorization when requesting data.

The mapping templates 118, 128 of the endpoint 108 are also customized in order to perform the authorization check using minimal logical resources, for example, by performing simple parsing, manipulations, or both on data/information received by the endpoint 108. In particular, the mapping template 118 is configured to reformat information from the client request 116 into a database query 120 that includes a permission query (e.g., with key based on the authentication ID of the client 102) and a data query (e.g., with key based on the requested data). The database query 120 is sent to the database 122, which searches the table 124*a* based on the permission query and the data query. The results from the database 122 are returned to the endpoint 108, where mapping template 128 is configured to reformat information from the database response 126 into an appropriate client response 130. In particular, when the database response 126 indicates a positive response (e.g., a true permission value or acknowledgement that the authenticated ID for client 102 was found in table 124*a*), the mapping template 128 builds the response to client 130 to include the requested data returned in the database response 126. If the database response 126 indicates a negative response (e.g., a negative permission value or indication that the authenticated ID for client was not found in table 124*a*, such as a null value or empty list), the mapping template 128 instead builds the response to client 130 to include an indication of error, such as an error code (e.g., HTTP 403—Forbidden) but without any of the requested data. The endpoint 108 is thus able to check authorization directly based on information returned by the database 122 and to return the data to the client, rather than relying on a separate compute service to check authorization and process data from database 122.

In one disclosed embodiment, a client 102 first undergoes authentication by sending an appropriate request 1 to authentication module 106 via network 104. For example, authentication module 106 can be a security token service, which returns an authenticated ID (e.g., assumed role resource name) with a security token. Using the authenticated ID, the client 102 sends a request 3 (e.g., calls the endpoint) for data from database 122 to endpoint 108 via network 104. For example, the client request 3 includes a request 116 to get (e.g., GetItem or BatchGetItem) data associated with ID A and category NS1. The request mapping module 112 of the endpoint 108 processes the request 116 using mapping template 118, such that the authenticated ID, the ID, and the category are populated into separate database requests. In the illustrated example, the authenticated ID "Client 1" corresponding to the client 102 is populated as the key for the first query and the category "NS1" is populated as part of the sort string for the first query. The second query is populated with the requested ID "A" as the key and the category "NS1" as part of the sort string for the second query. For example, Table 1 below illustrates exemplary programming that may be used for mapping template 118 to process a BatchGetItem request.

TABLE 1

Exemplary programming for a mapping template to generate a BatchGetItem request for data and authorization information.

```
{
    "RequestItems": {
        "testTableName": {
            "Keys": [
                {
                    "testArnValue": {
                        "S": $context.identity.userArn
                    },
                    "testRangeValue": {
                        "S": "rangeValue"
                    }
                }
            ]
        }
    }
}
```

The endpoint 108 then sends the database query 120 to the database 122 via 4. The database 122 returns a response 126 to endpoint 108 via 5, the response 126 including at least the requested data or an error or null value if either the requested data does not exist or the authenticated ID is not authorized or not found by the database. If the authenticated ID corresponding to client 102 is found in table 124a, the response 126 also includes the permission item. The response mapping module 114 of the endpoint 108 processes the database response 126 using mapping template 128, to parse the permission item to check if the client 102 has valid authorization to make the call for the requested data. If the authenticated ID is authorized, the mapping template 128 populates the response 130 with the returned data. If, however, the authenticated ID is not authorized (e.g., permission value is negative) or is otherwise not found by the database 122 (e.g., when only authorized IDs are included in table 124a), then the mapping template 128 populates the response 130 with an indication of error (e.g., error status code or an error message) without the requested data. For example, Table 2 below illustrates exemplary programming that may be used for mapping template 128 to process a database response with authorization information.

TABLE 2

Exemplary programming for a mapping template to process a database response with authorization information.

```
#if ($permission = true)
    $data
#else
    #set($context.responseOverride.status = 403)
```

TABLE 2-continued

Exemplary programming for a mapping template to process a database response with authorization information.

```
    $error
#end
```

In an embodiment, requested data is thus returned from database 122 to endpoint 108 regardless of the authorization status. Rather, the endpoint 108 confirms authorization based on the returned permission value from the database 122 before allowing the returned data to pass through to client 102 via 6. In the illustrated example, the database response 126 includes a "False" permission value for key "Client 1" and the corresponding data "Data A" associated with key "A". Thus, the mapping template 128 builds the response to client 130 as an error code (HTTP 403—Forbidden).

In some embodiments, the mapping template 118 is configured to pass along a request from client 102 for particular attributes of the requested data as part of the data query of the database query 120. For example, the client request 116 includes a query parameter (e.g., "?attributesWeWant=attribute1, attribute2"), and the mapping template 118 parses the request and populates it as part of the database query 120. For example, Table 3 below illustrates exemplary programming that may be used for mapping template 118 to process a BatchGetItem request with attribute query.

TABLE 3

Exemplary programming for a mapping template to generate a BatchGetItem request for data and authorization information with attribute query.

```
"testTableName": {
    "Keys": [
        {
            "testArnValue": {
                "S": $context.identity.userArn
            },
            "testRangeValue": {
                "S": "rangeValue"
            }
        }
    ],
    "ProjectionExpression":
        $input.params('querystring').get('attributesWeWant')
}
```

Figure 2:
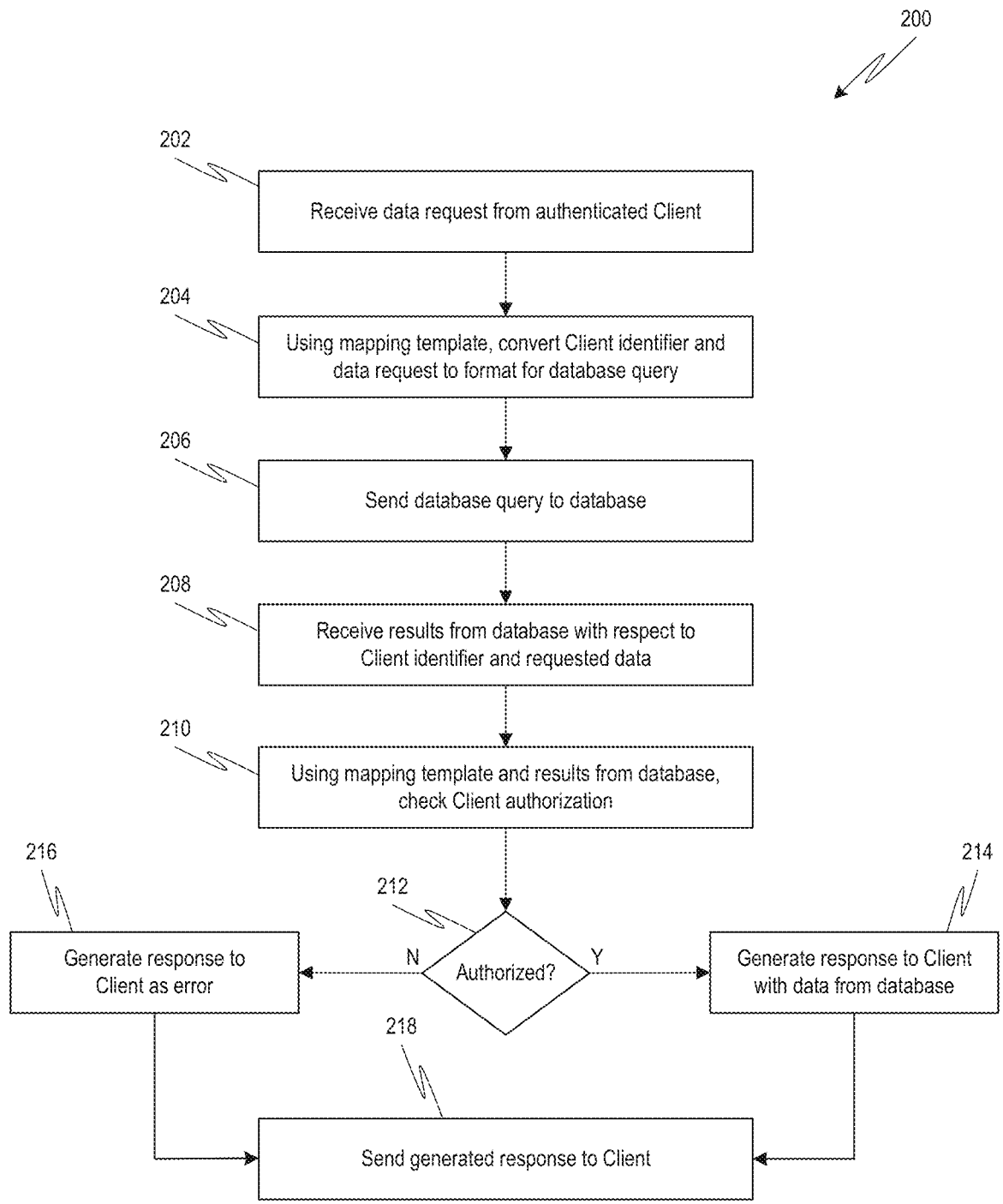
FIG. 2 is a process flow diagram for compute-less authorization by an endpoint, according to one or more embodiments of the disclosed subject matter.

FIG. 2 illustrates a process flow diagram for an exemplary method 200 for compute-less authorization by an endpoint, such as endpoint 108, for access to data in database, such as database 122. The method 200 initiates at 202, where a data request is received by the endpoint from an authenticated client, such as client 102. The method 200 proceeds to 204, where the client request is converted into a database query format using one or more mapping templates of the endpoint. In particular, the mapping template extracts a client identifier (e.g., authenticated ID) from the client request and assembles the client identifier and data request into separate queries for the same table of the database, for example, a permission query and a data query. The method 200 then proceeds to 206, where the database query is sent to the database. The database interrogates the data table and returns information (e.g., permission value and data set) that matches the permission and data queries (e.g., key and sort values) to the endpoint at 208.

The method 200 then proceeds to 210, where the results from the database are processed by one or more mapping templates of the endpoint to check authorization. In particular, the mapping template converts information (or lack thereof) returned by the database for the permission query into an indication of authorization. If the information returned by the database indicates that the authenticated client is authorized to access the requested data (e.g., as reflected by some true permission value contained in the data table and returned in the database response), then the method 200 proceeds from 212 to 214. At 214, the mapping template builds the response to client using the data requested by the client and returned by the database, which response can then be sent from the endpoint to the client at 218.

However, if the information returned by the database indicates that the authenticated client is not authorized to access the requested data (e.g., as reflected by some false permission value contained in the data table and returned in the database response, or by a null or empty set returned in the database response reflecting that the client identifier was not found in the data table), then the method 200 proceeds from 212 to 216. At 216, the mapping template of the endpoint builds the response to client to indicate an error (e.g., as a status code or error message) without any of the requested data, which response can then be sent from the endpoint to the client at 218. The method 200 can return to 202 for processing of a subsequent request by the same client or a different client.

Figure 3:
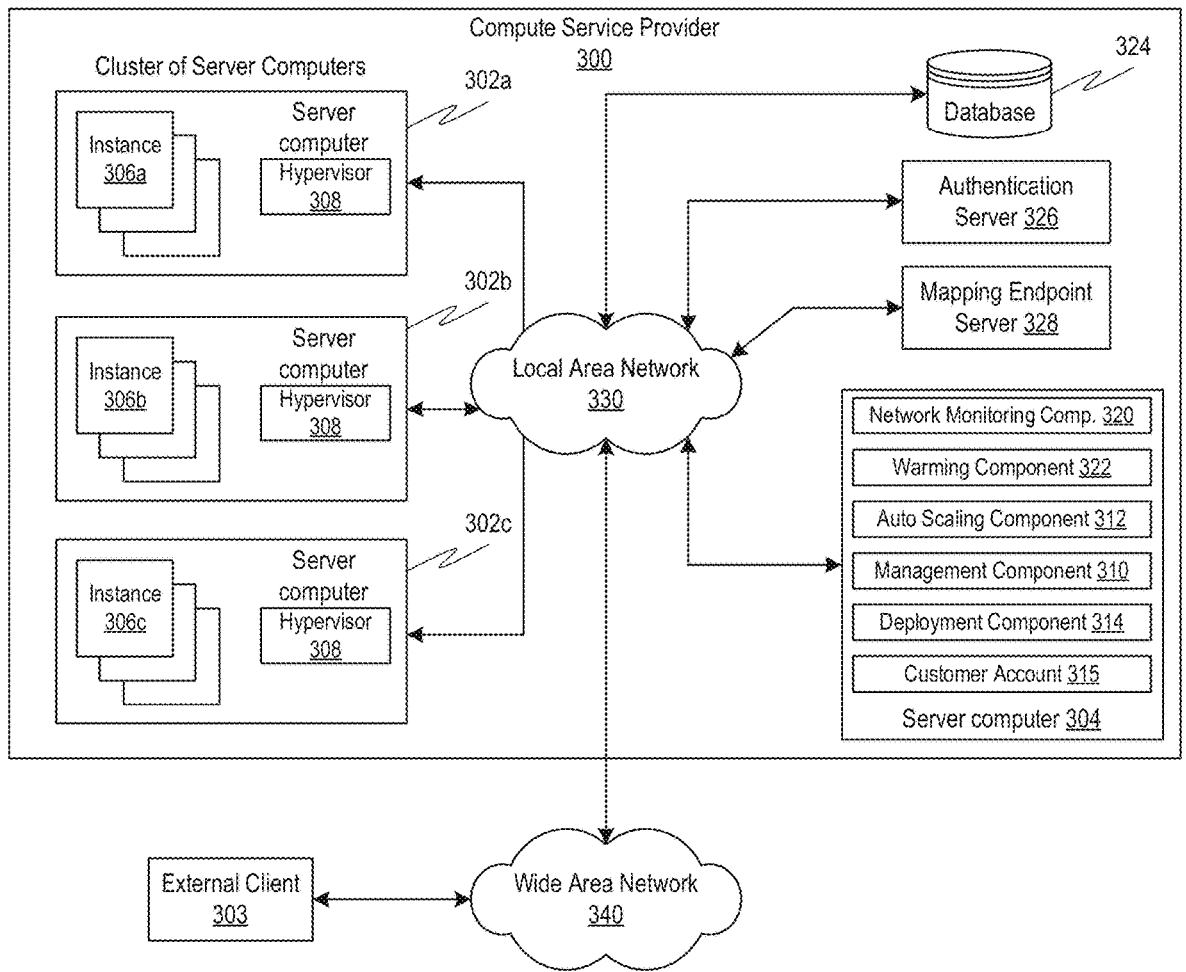
FIG. 3 is a simplified schematic diagram of an exemplary multi-tenant environment employing compute-less authorization by an endpoint, according to one or more embodiments of the disclosed subject matter.

FIG. 3 is a computing system diagram of a network-based compute service provider 300 that illustrates an environment in which embodiments described herein can be used. By way of background, the compute service provider 300 (i.e., the cloud provider) is capable of delivery of computing and storage capacity as a service to a community of end recipients. In an example embodiment, the compute service provider 300 is established for an organization by or on behalf of the organization, for example, as a "private cloud environment." In another embodiment, the compute service provider 300 supports a multi-tenant environment, wherein a plurality of customers operates independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

The particular illustrated compute service provider 300 includes a plurality of server computers 302a-302c. While only three server computers are shown, any number can be used, and large centers can include thousands of server computers. The server computers 302a-302c can provide computing resources for executing software instances 306a-306c. In one embodiment, the instances 306a-306c are virtual machines. As known in the art, a virtual machine is an instance of a software implementation of a machine (i.e., a computer) that executes applications like a physical machine. In the example of virtual machines, each of the servers 302a-302c can be configured to execute a hypervisor 308 or another type of program configured to enable the execution of multiple instances 306 on a single server. Additionally, each of the instances 306 can be configured to execute one or more applications.

It should be appreciated that although the description above focuses on the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 are reserved for executing software components for managing the operation of the server computers 302 and the instances 306. For example, the server computer 304 executes a management component 310. A customer accesses the management component 310 to configure various aspects of the operation of the instances 306 purchased by the customer. For example, the customer purchases, rents or leases instances and makes changes to the configuration of the instances. The customer also specifies settings regarding how the purchased instances are to be scaled in response to demand. An auto-scaling component 312 scales the instances 306 based upon rules defined by the customer. In one embodiment, the auto-scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto-scaling component 312 can monitor available computing resources over an internal management network and modify resources available based on need.

A deployment component 314 is used to assist customers in the deployment of new instances 306 of computing resources. The deployment component has access to account information associated with the instances, such as who is the owner of the account, credit card information, country of the owner, etc. The deployment component 314 receives a configuration from a customer that includes data describing how new instances 306 should be configured. For example, the configuration specifies one or more applications to be installed in new instances 306, provides scripts and/or other types of code to be executed for configuring new instances 306, provides cache logic specifying how an application cache should be prepared, and other types of information. The deployment component 314 utilizes the customer-provided configuration and cache logic to configure, prime, and launch new instances 306. The configuration, cache logic, and other information is specified by a customer using the management component 310 or by providing this information directly to the deployment component 314. The instance manager can be considered part of the deployment component.

Customer account information 315 includes any desired information associated with a customer of the multi-tenant environment. For example, the customer account information includes a unique identifier for a customer, a customer address, billing information, licensing information, customization parameters for launching instances, scheduling information, auto-scaling parameters, previous IP addresses used to access the account, etc.

A server 328 is coupled to the network 330 and is configured to act as an endpoint for access to database server 324 by authenticated clients (e.g., instances 306a-306c and/or external client 303). For example, an authentication server 326 is coupled to network 330 and is used to authenticate clients (e.g., instances 306a-306c and/or external client 303) prior to accessing endpoint server 328. In a particular example, the authentication server 326 is configured as a security token service. The authentication server 326 thus receives a request for authentication from a client and returns an authenticated ID with a security token that can be used by the client to access endpoint 328.

Database server 324 is also coupled to network 330 and includes a data store with one or more data tables. At least one of the data tables includes entries corresponding to a permission model. The same data table or a different data table includes data to which clients (e.g., server computers 302a-302c or external client 303) may desire access. The endpoint server 328 includes one or more mapping templates that convert a client request for access to the database server 324 into appropriate authorization and data queries of the data table. The endpoint server 328 also includes one or more mapping templates that process a response from the database server 324 to determine authorization and to return the requested data to the client when authorized. The endpoint server 328 thus provides a client-facing interface and direct channel to data from database server 324, without requiring a separate compute service component between endpoint 328 and database 324 for determining authorization and processing data from the data table.

The latency of the endpoint 328 and database 324 in returning data to the requesting client may be affected by transactions per second (TPS) performed by the endpoint and database, with higher TPS values resulting in lower latencies. In some embodiments, the server computer 304 can thus include a warming component 322, which is designed to generate and send "faux" data requests to the endpoint server 328. The faux requests from the warming component 322 are between client requests or otherwise during periods of reduced or minimal client requests in order to keep "warm" the connections between the endpoint 328 and database 324 and thereby reduce latency for subsequent client requests. Because there may be a cost associated with such faux requests, server computer 304 can also include a network monitoring component 320 that monitors traffic to endpoint 328. The timing and amount of faux data requests by the warming component 322 can thus be adjusted in response to the monitored traffic, for example, to meet a target threshold TPS and to minimize or at least reduce costs associated with the warming. Although shown as components of server computer 304, the warming component 322 and/or network monitoring component 320 may instead be part of another server computer or as an independent server computer within compute service provider 300.

The network 330 is utilized to interconnect the server computers 302a-302c, the server computer 304, the database server 324, the authentication server 326, and the mapping endpoint 328. The network 330 can be a local area network (LAN) and can be connected to a Wide Area Network (WAN) 340 so that end users can access the compute service provider 300.

Alternatively or additionally, an external client 303 (e.g., server computer external to compute service provider 300) accesses data held by database 324 via a request to endpoint 328 over networks 330, 340. It should be appreciated that the network topology illustrated in FIG. 3 has been simplified and that many more networks and networking devices can be utilized to interconnect the various computing systems disclosed herein.

Figure 4A:
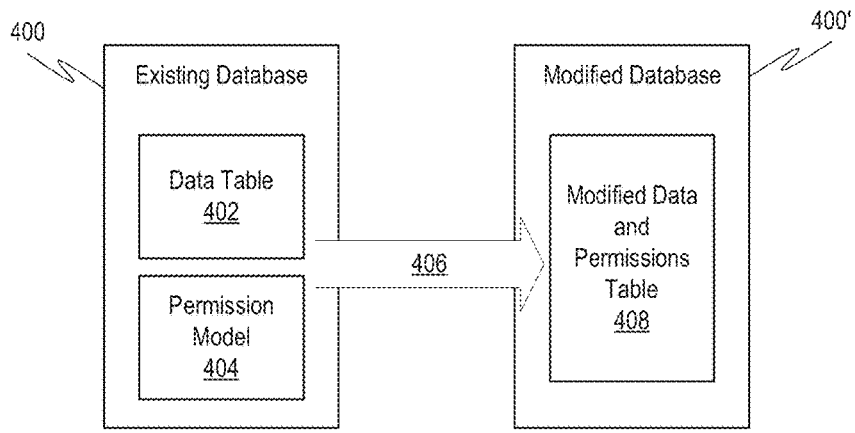
FIG. 4A is a simplified schematic diagram of database conversion for use in compute-less authorization by an endpoint, according to one or more embodiments of the disclosed subject matter.

FIG. 4A is a simplified illustration of migration of an existing database 400 for use in compute-less authorization by an endpoint, such as endpoint 108. In database 400, permissions are stored in table 404, which is different than the table 402 that contains data for access by clients that are known to be authorized. In addition, the permissions in table 404 are stored in a way that was not accessible to the endpoint, in particular, in a hierarchical data serialization format (e.g., Ion) that required de-serializing using a compute service. Thus, in order to allow direct access to the permissions by the endpoint, existing database 400 is migrated at 406 into modified database 400'. In particular, the permission model in table 404 is converted into a format that can be included in a same table 408 as the data. For example, a separate entry is stored within table 408 for each authenticated ID and for each entity level (e.g., category), which yields a simple true/false response for processing by the relatively simplistic logic of the mapping templates of the endpoint. Unlike the configuration of existing database 400, the permissions stored in table 408 of modified database 400' require no serialization or deserialization, although at the expense of more duplication of entries.

In addition to reformatting the permission model and combining with the data in a single table 408, the conversion 406 also restructures the data from table 402. In particular, for processing by the mapping templates of the endpoint, the structure of the data in table 408 is made flatter and more accessible as compared to the structure of data in table 402. In other words, the data in table 408 is formatted so that it can be returned by the mapping template of the endpoint without further processing or with only minimal further processing. Indeed, since there is no longer a compute service between the database and the endpoint to check authorization and process data (e.g., perform deserialization, convert between JSON and ION, etc.), the data can be stored in table 408 exactly or mostly in a format expected by the client. For example, the data fragments from data table 402 are converted into a plain text readable format in table 408. In some embodiments, the migration 406 also changes the partition key.

Figures 4B, 5:
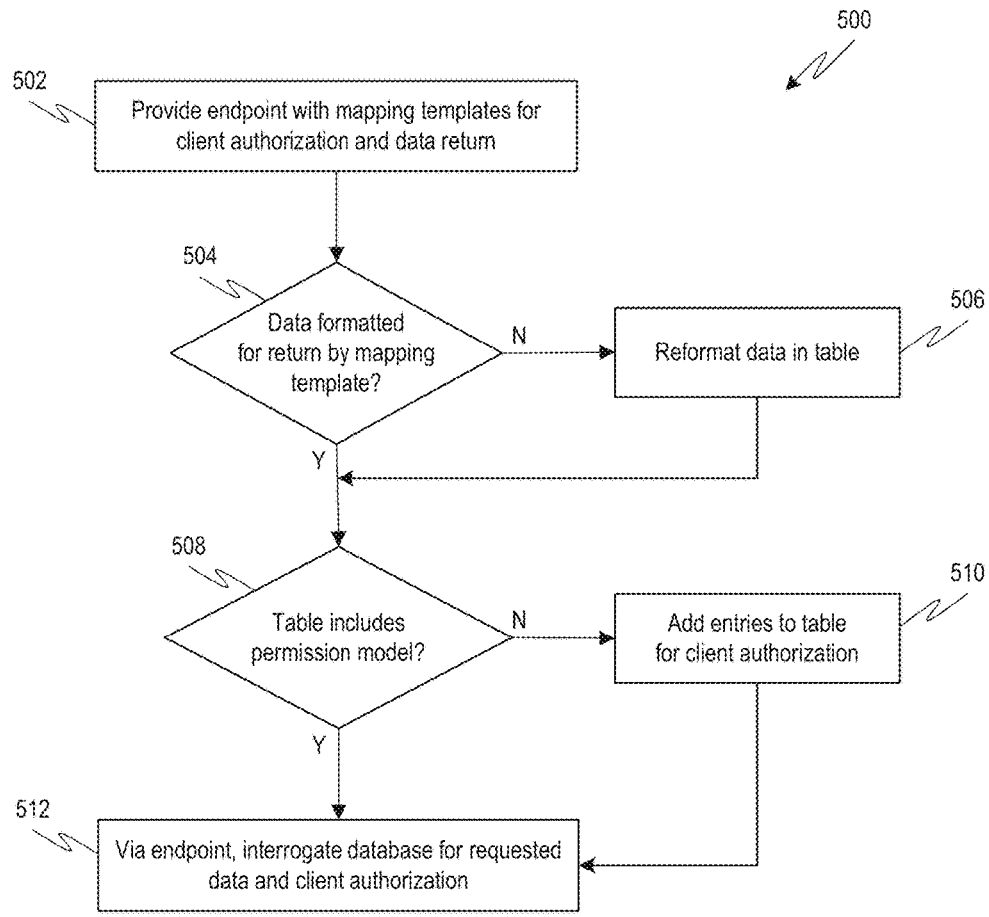
FIG. 4B shows a portion of an exemplary data table of a converted database for use in compute-less authorization by an endpoint, according to one or more embodiments of the disclosed subject matter.
FIG. 5 is an exemplary process flow diagram for database migration for use in compute-less authorization by an endpoint, according to one or more embodiments of the disclosed subject matter.

FIG. 4B shows a portion of an exemplary data table 408 that includes actual data items 410 with permission items 412. Table 408 includes, for example, an ID column 414 (e.g., a primary filter), a range column 416 (e.g., a secondary filter), a data column 418 (e.g., the data to be returned to the client for the corresponding ID), and a category column 420 (e.g., the entity level). For the permission items 412, each unique pair of authenticated ID and category is entered as a separate row in table 408 and amongst adjacent entries for actual data items 410. If an authenticated ID and category combination in a database query from the endpoint is not found in table 408, the database returns a null or empty set with respect to the permission query part, thereby indicating to the mapping template of the endpoint that the client is not authorized for the requested data. For example, since "arn:aws:iam::6488360:role/real" is not in column 414 of table 408, the mapping template of the endpoint would determine that such an authenticated ID is not authorized to access data associated with the category, e.g., "music" or "clothing". In some embodiments, table 408 is provided with a further permissions column that specifies a true or false value for each authenticated ID and category combination. The database thus returns the value in the permission column in response to the permission query part of the database query, and the mapping template of the endpoint determines authorization based on the returned value.

In some embodiments, table 408 can retain a history of permission. For example, the permission history can be reflected by an appendage to the secondary filter in sort ID column 416, such as "#{permission}#{version}". For example, "arn:aws:iam" "6488358:role/real" in table 408 has an initial read permission reflected by "music#read#0" and a later read permission reflected by "music#read#1". Separate entries can be provided for each permission, e.g., read, write, delete, etc. The sort ID can be used by the mapping template of the endpoint to infer the category that permission allows, with the latest permission being retained.

In some embodiments, table 408 is provided with a further column for attribute level permissions that specifies attributes of the data to which the authenticated ID has access, for example, when a query parameter for particular attributes are passed to the database from the endpoint. Because separate permission items are provided in table 408, separate attributes can be specified in the attribute permission column and are used by the mapping template of the endpoint to control attribute level access. In some embodiments, each attribute is stored in the table 408 as its own key/value pair. The database query from the endpoint includes the query for the specific attribute. If the database returns to the endpoint that the key exists in the item in table 408, that would indicate to the mapping template of the endpoint that the client is authorized to access the attribute. In some embodiments, the requested operation (e.g., read, write, delete, etc.) can be inferred from the secondary filter or sort key (e.g., column 416), in particular the appendage to the permission item (e.g., #read, #write, #delete). Alternatively, the attributes can be stored in table 408 in a single item as a list, and the mapping template of the endpoint can perform an operation (e.g., "string contains ( )") on the list object returned by the database.

In some embodiments, the permission items 412 can be stored in a separate table from the actual data items 410. This could allow for cleaner separation of responsibility between database tables as well as avoiding non-uniform partition keys or other columns. It could also simplify the migration of existing databases into the format required for the permission model and data items. However, such a configuration may introduce additional latency, require configuring the mapping templates to direct queries to separate tables, and/or increase costs to support the capacity of both tables.

FIG. 5 illustrates a process flow diagram for an exemplary method 500 to setup a system for compute-less authorization in accessing data in a database, such as database 122 or 400'. The method 500 initiates at 502, where an endpoint is provided. The endpoint, such as endpoint 108, is provided with mapping templates that configures a database query based on a client request and that determines client authorization based on information returned by the database. If authorized, the mapping template generates a response with the data from the database for sending from the endpoint to the client. The method 500 can proceed to 504, where it is determined if the data contained within the database is in a format that can be returned by the mapping template with little or no processing. For example, as discussed above, the data should be in a plain text format. If the data is not in such a format, the method 500 proceeds to 506, where the data is reformatted and stored within a data table of the database. For example, a program script can be used to convert existing data to plain text readable format.

Otherwise, the method 500 proceeds to 508, where it is determined if the data table also includes the permission model in a format that can be utilized by the mapping template of the endpoint. For example, as discussed above, each authenticated ID and entity level is provided as a separate entry within the data table of the database. If the permission model is not in such a format, the method 500 proceeds to 510, where individual entries for the permission model are added to the data table. For example, a program script can be used to deserialize an existing permission model and to store the resulting permissions as separate entries in the data table. Otherwise, the method 500 proceeds to 512, where the endpoint and modified database are used, for example, in a manner similar to that described above with respect to FIGS. 1-2.

Although the above description focuses on the use of an endpoint to provide compute-less authorization in reading of data from database, embodiments of the disclosed subject matter are not limited to reading of data. Indeed, the teachings of compute-less authorization discussed above are also applicable to other database functions, such as write and delete. Moreover, although the above description focuses on the use of an endpoint to provide compute-less authorization for accessing a database, the endpoint may instead provide authorization as a separate independent service in some embodiments.

Figure 6:
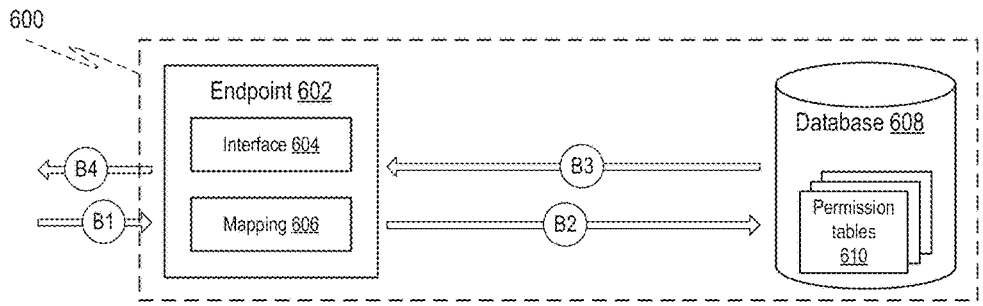
FIG. 6 is a simplified schematic diagram of a setup for compute-less authorization as a service, according to one or more embodiments of the disclosed subject matter.

For example, FIG. 6 shows an exemplary setup 600 for compute-less authorization as a service. Similar to the configuration of FIG. 1, setup 600 includes an endpoint 602 (e.g., API gateway) operatively coupled to a database 608. The endpoint 602 includes an interface component 604 and a mapping module 606. The interface component 604 is configured to coordinate communication with a network (not shown) and with database 608. The mapping module includes software logic configured to map a transmission received by the interface component 604 into a separate format for transmission from the interface component 604. Database 608 (i.e., database service) includes one or more data tables 610 storing separate entries for each authenticated ID and for each entity level. In some embodiments, further separate entries can be stored in the data table 610 based on requested function (e.g., read, write, delete) or based on data attributes. However, unlike the setup in FIG. 1, the database 608 includes permission entries only, not client accessible data. Thus, in this setup, the endpoint 602 is configured to provide only an indication of authorization, which may be used by the client or another endpoint to permit access to another resource or perform a function.

In operation, the client sends an API request B1 to service 600 for authorization. The authorization request may be for the client itself or for a different client being handled by the requesting client (e.g., when the requesting client is an endpoint interfacing with the different client). The API request B1 is received by endpoint 602. Similar to the embodiments described above, the mapping module 606 of the endpoint 602 processes the request using a mapping template, such that the client identifier and category are populated into a database query. The endpoint 602 then sends the database query to the database 608 via B2. The database 608 returns a response to endpoint 602 via B3, the response including an indication as to whether the client is authorized. For example, if the client identifier is found in table 610, the response can include a true permission value. The mapping module 604 of the endpoint 602 processes the database response using a mapping template. If the client identifier is authorized, the mapping template populates a response to the requesting client indicating that the client identifier is authorized, which response is then sent to the client via B4. If, however, the client identifier is not authorized (e.g., permission value is negative) or is otherwise not found by the database 608 (e.g., when only authorized client identifiers are included in table 610), then the mapping template populates the response to the requesting client indicating that the client identifier is not authorized (e.g., error status code or an error message), which response is then sent to the client via B4.

Figure 7:
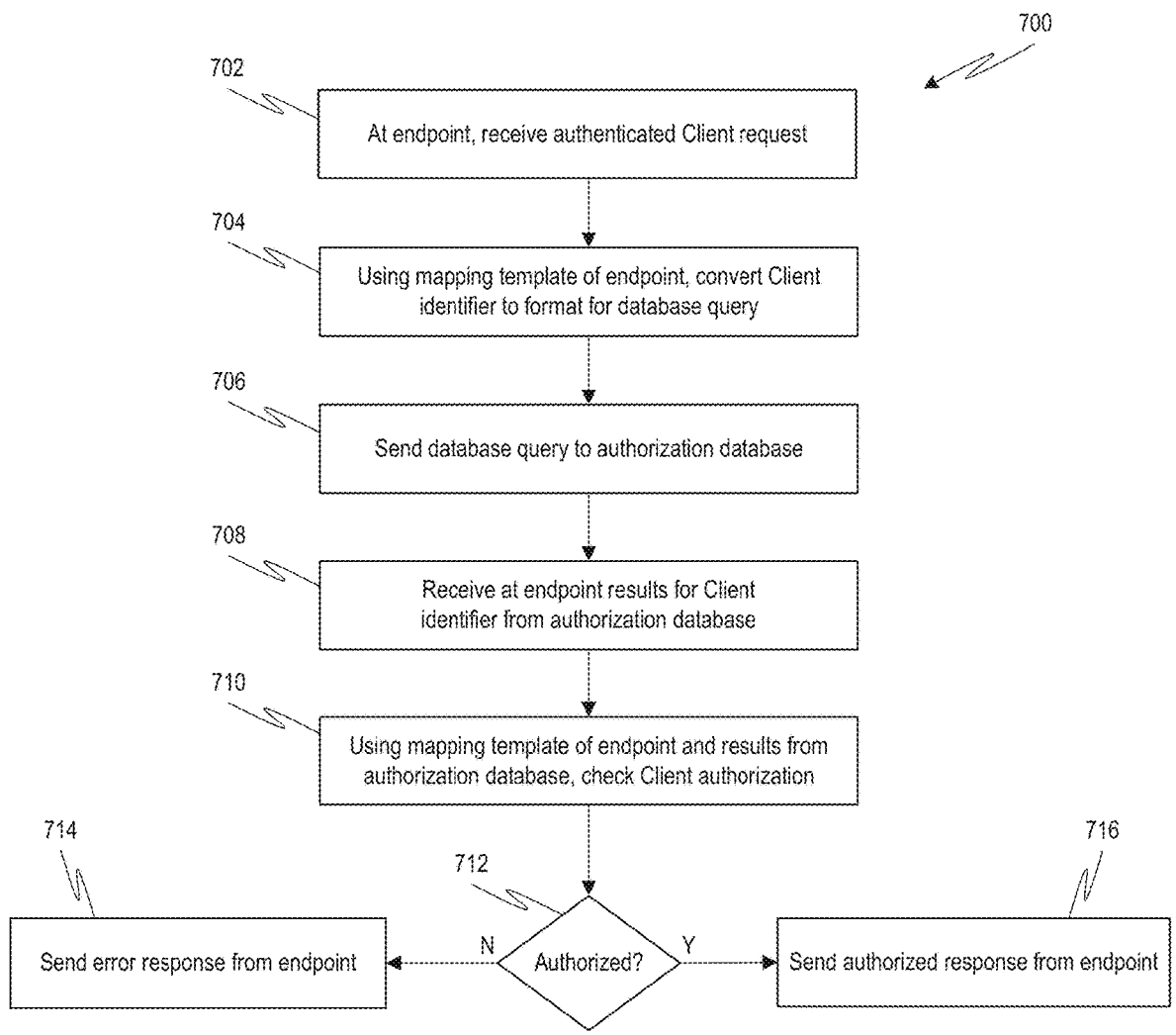
FIG. 7 is a process flow diagram for compute-less authorization as a service, according to one or more embodiments of the disclosed subject matter.

FIG. 7 illustrates a process flow diagram for an exemplary method 700 for compute-less authorization as a service, for example using setup 600. The method 700 initiates at 702, where an authorization check request is received by the endpoint from an authenticated client. The method 700 proceeds to 704, where the client request is converted into a database query format using one or more mapping templates of the endpoint. In particular, the mapping template extracts a client identifier (e.g., authenticated ID) from the client request, which may be the same client or a different client than the requesting client. The mapping template assembles the client identifier into an appropriate database query for a permission table of the database. The method 700 then proceeds to 706, where the database query is sent to the database. The database interrogates the permission table and returns information (e.g., permission value) that matches the permission query (e.g., key and sort values) to the endpoint at 708.

The method 700 then proceeds to 710, where the results from the database are processed by one or more mapping templates of the endpoint to check authorization. In particular, the mapping template converts information (or lack thereof) returned by the database for the permission query into an indication of authorization. If the information returned by the database indicates that the authenticated client is authorized (e.g., as reflected by some true permission value contained in the data table and returned in the database response), then the method 700 proceeds from 712 to 716. At 716, the mapping template builds the response to client indicating that the client identifier is authorized, which response can then be sent from the endpoint to the client. However, if the information returned by the database indicates that the client identifier is not authorized (e.g., as reflected by some false permission value contained in the data table and returned in the database response, or by a null or empty set returned in the database response reflecting that the client identifier was not found in the data table), then the method 700 proceeds from 712 to 714. At 714, the mapping template of the endpoint builds the response to client to indicate the client identifier is not authorized (e.g., as a status code or error message), which response can then be sent from the endpoint to the client. The method 700 can return to 702 for processing of a subsequent request by the same client or a different client.

In some embodiments, authorization can be inferred by the endpoint based on a prior authentication of the client. For example, the client may be authenticated using an identity and access management (IAM) service that assigns a role. The endpoint can be associated with the IAM role to allow only certain operations (e.g., read, write, delete) on data in table of the database. Thus, if the client already has permission to call the endpoint by virtue of the IAM role, the endpoint presumes authorization to access the data. For example, IAM policies can be restricted by specific resource for the endpoint, thereby limiting the operations available to requesting clients based on the endpoint. For example, Table 4 below illustrates exemplary programming that may be used for configuring the endpoint.

TABLE 4

Exemplary programming for configuring an endpoint for authorization based on IAM policies.

```
{
    "Action": [ "apigateway:GET" ]
    "Resource": [
        "arn:aws:apigateway:us-east-1::range1",
        "arn:aws:apigateway:us-east-1::range2"
    ]
},
{
    "Action": [ "apigateway:POST" ]
    "resource": [
        "arn:aws:apigateway:us-east-1::range3"
    ]
}
```

Alternatively or additionally, a separate pseudo-endpoint can be created where authorization of the client is presumed based on the IAM in order to permit access to all attributes associated with specific categories. The data retrieval and authorization checking using mapping templates as described above are maintained in one endpoint. The second endpoint however checks permissions via the response mapping templates without having to make a BatchGetItem call. Instead, the second endpoint can be locked down to specific categories on a per-client basis. The mapping template of the second endpoint prepopulates the store key of the database query with the corresponding category. For example, Table 5 below illustrates exemplary programming that may be used for the response mapping template of the second endpoint, with the IAM permission being the same as above in Table 4.

TABLE 5

Exemplary programming for a response mapping template of the second endpoint.

```
{
    "Key": {
        "testKeyValue": {
            "S": "12345"
        },
        "testRangeValue": {
            "S": $input.path('rangeValue')
        }
    }
}
```

Figure 8:
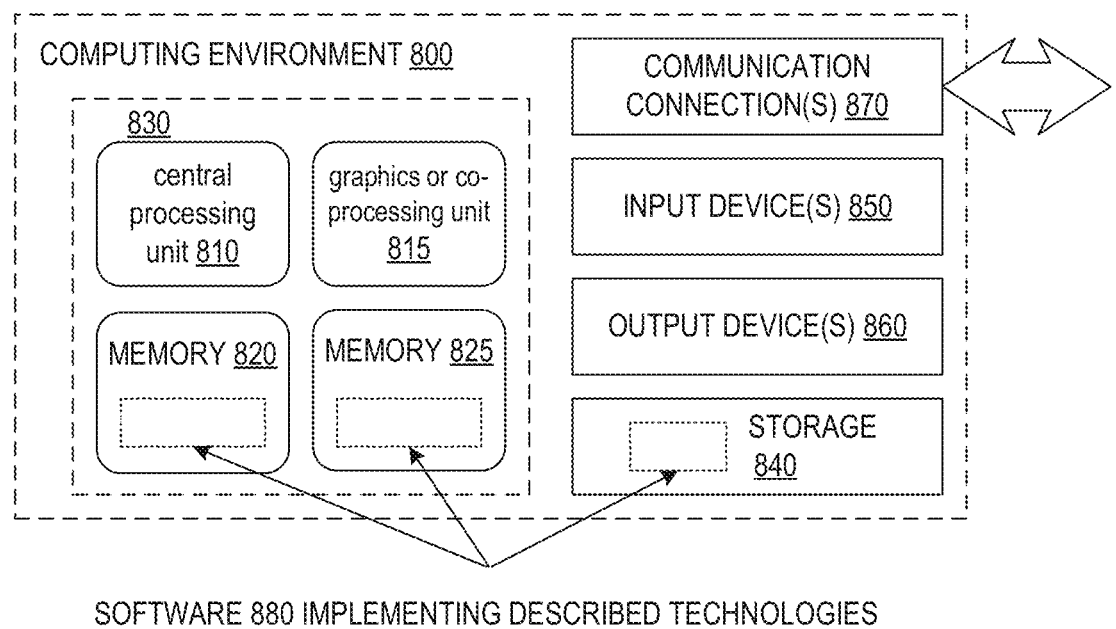
FIG. 8 is a simplified schematic diagram depicting a generalized example of a computing environment in which the disclosed subject matter may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 is any of a variety of computing devices (e.g., desktop computer, laptop computer, server computer, tablet computer, etc.).

The computing environment 800 includes one or more processing units 810, 815 and memory 820, 825. In FIG. 8, this basic configuration 830 is included within a dashed line. The processing units 810, 815 execute computer-executable instructions. Each processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way, and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures do not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A compute-less authorization method comprising:
receiving, at an endpoint, an application programming interface (API) request from a client, the API request including a data request and an identifier corresponding to the client;
at the endpoint, using mapping templates to create a database query from the API request, the database query including a first query based on the client identifier and a second query based on the data request;
sending the database query from the endpoint to a database;
returning, from the database to the end point, data in the database corresponding to one or more of the first query and the second query;
at the endpoint, using the mapping templates to check authorization of the client based on the returned data from the database;
sending from the endpoint to the client the returned data corresponding to the second query when the check using the mapping templates indicates the client identifier is authorized; and
sending from the endpoint to the client an error when the check using the mapping templates indicates the client identifier is not authorized.

2. The method of claim 1, wherein authorization data corresponding to client identifiers is in a same table of the database as data requested by the client.

3. The method of claim 1, wherein the client identifier is an identifier assigned during authentication of the client prior to sending the API request.

4. The method of claim 1, wherein:
the data corresponding to the second query is stored in the database in a plain text format,
the data corresponding to the second query is returned to the endpoint in the plain text format, and
the returned data corresponding to the second query is sent to the client in the plain text.

5. The method of claim 1, wherein the using the mapping templates to check authorization comprises:
determining that the client identifier is authorized when the returned data from the database includes a true value for the first query, the true value indicating that the client identifier is found in the database; and
determining that the client identifier is not authorized when the returned data from the database is other than the true value for the first query.

6. The method of claim 5, wherein the client identifier is determined as not authorized when the returned data for the first query is a null or empty list.

7. The method of claim 1, wherein the using the mapping templates to check authorization comprises:
determining that the client identifier is authorized when the returned data from the database includes a positive permission attribute for the first query, the positive permission attribute indicating that the identifier is authorized for the requested data; and
determining that the client identifier is not authorized when the returned data from the database includes a negative permission attribute for the first query, the negative permission attribute indicating that the identifier is not authorized for the requested data.

8. The method of claim 1, wherein the first query and the second query of the database query have a same format.

9. One or more non-transitory computer-readable storage media collectively storing computer-executable instructions that, when executed by one or more computer systems, configure the one or more computer systems to collectively perform operations comprising:
receiving, at an endpoint, an application programming interface (API) request from a client, the API request including an identifier corresponding to the client;
at the endpoint, generating a database query based on the API request, the database query including a first query based on the identifier;
sending the database query from the endpoint to a database;
receiving, at the endpoint, a first response from the database based on the database query;
prior to sending the database query, using mapping templates at the endpoint to generate the database query with a second query based on the API request;
receiving at the endpoint the first response based on the database query, the first response including requested data corresponding to the second query;
at the endpoint and using the mapping templates, generating a second response to return the requested data from the first response when the first response indicates the identifier is authorized.

10. The one or more non-transitory computer-readable storage media of claim 9, wherein the mapping templates generates the second response with the requested data when the first response from the database includes an indication that the client identifier is authorized for the requested data, and generates the second response without the requested data when the first response from the database includes an indication that the client identifier is not authorized for the requested data.

11. The one or more non-transitory computer-readable storage media of claim 9, wherein the first query and the second query of the database query have a same format and are queries to a same table in the database.

12. The one or more non-transitory computer-readable storage media of claim 9, wherein the mapping templates generates the second response with an indication that the client identifier is authorized when the first response from the database includes an indication that the client identifier is found in the database, and otherwise generates the second response with an indication that the client identifier is not authorized.

13. The one or more non-transitory computer-readable storage media of claim 9, wherein the mapping templates employ a Java-based template engine of the endpoint.

14. The one or more non-transitory computer-readable storage media of claim 9, wherein:
the mapping templates parse, manipulate, or parse and manipulate the API request to convert the API request into the database query; and
the mapping templates parse, manipulate, or parse and manipulate the first response from the database to convert the first response into the second response for the client.

15. The one or more non-transitory computer-readable storage media of claim 9, wherein the media collectively store additional computer-executable instructions that, when executed by the one or more computers systems, configure the one or more computers systems to collectively configure the endpoint as an API gateway.

16. A system comprising:
one or more processors; and
memory storing instructions executable by the one or more processors to cause the system to implement an endpoint to perform operations comprising:

receiving an application programming interface (API) request from a client, the API request including an identifier corresponding to the client;

prior to sending a response to the API request, using mapping templates, generating a database query based on the API request, the database query including a first query based on the identifier;

sending the database query to a database;

receiving, at the endpoint, a first response from the database based on the database query, the first response including requested data;

using the mapping templates, generating a second response for the client based on the first response, the second response providing an indication whether the identifier is authorized; and sending the second response to the client including the requested data.

17. The system of claim 16, wherein the mapping templates employ a Java-based template engine.

18. The system of claim 16, wherein the endpoint is implemented as an API gateway that conforms to representational state transfer (REST) software architecture.

19. The system of claim 16, further comprising the database, wherein the database stores a permission model for client identifiers in a first table, and the database also stores data requested by the client in the first table with the permission model.

* * * * *